Sept. 11, 1934.    J. M. GWINN, JR    1,973,064
ANTIFRICTION BEARING
Filed June 23, 1933

Inventor
Joseph M. Gwinn Jr
By Maréchal & Noé
Attorney

Patented Sept. 11, 1934

1,973,064

UNITED STATES PATENT OFFICE 1,973,064

ANTI-FRICTION BEARING

Joseph M. Gwinn, Jr., Buffalo, N. Y., assignor to Consolidated Aircraft Corporation, Buffalo, N. Y., a corporation of Delaware Application June 23, 1933, Serial No. 677,209

7 Claims. (Cl. 308—194)

This invention relates to antifriction bearings and more particularly to ball bearings of the self-aligning type.

One object of the invention is the provision of a self-aligning ball bearing of simple construction and incorporating means on opposite sides of the bearing for effectively sealing the same.

Another object of the invention is the provision of a bearing having a two-part inner bearing member and an integral outer bearing member, each of the inner bearing member parts having a portion of slightly larger diameter than an outwardly disposed portion of the outer race member.

Other objects and advantages of the invention will be apparent from the following description, the appended claims and the accompanying drawing, in which—

Figure 1:
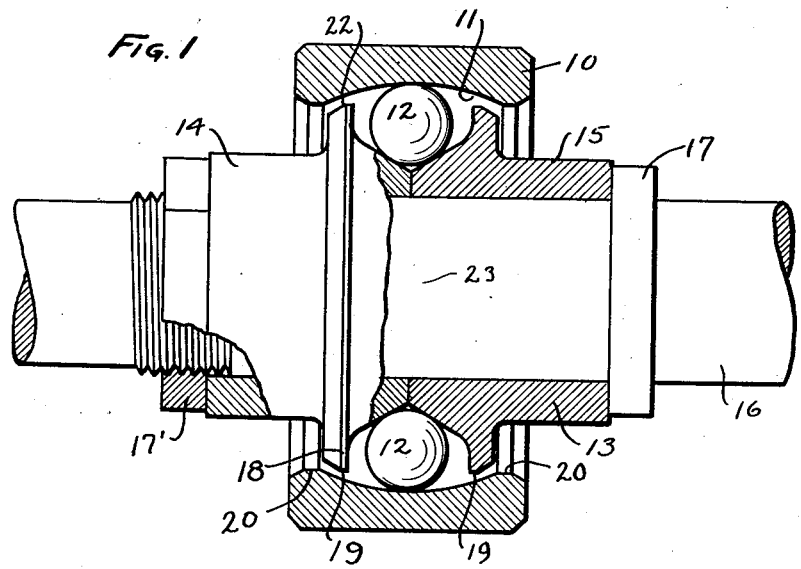
Fig. 1 is a central section of a bearing embodying the present invention.

Referring more particularly to the drawing by reference numerals, 10 designates an outer bearing member having a spherically ground internal bearing surface 11 which forms the outer raceway for a series of balls 12. Disposed within the outer bearing member 10 is the inner bearing member 13 composed of two axially aligned parts 14 and 15, preferably of similar form and construction. The two parts 14 and 15 are suitably fastened to a common carrying shaft 16. They may, for example, be held to the shaft by end collars or nuts provided on the shaft. As shown the shaft is provided with a collar or shoulder 17, and a nut 17' is threaded on the shaft and engaged tightly with the part 14, holding the parts of the inner bearing member in fixed relationship with one another and with the carrying shaft 16.

The two parts of the inner bearing member 13 together provide an inner raceway for the balls, the raceway as herein shown as being of substantially conical form although it may be otherwise shaped to give greater contact surface between the balls and the race member. It will be apparent that the balls 12 locate the inner race with respect to the outer race against any radial and axial displacement although the axis of the shaft 16 may be moved angularly with respect to the central axis of the outer race member in a manner characteristic with any self-aligning bearing.

Each of the parts 14 and 15 of the inner race member incorporates either as an integral part thereof or as a separate piece pressed or otherwise attached to it, a skirt flange or extended portion 18. This skirt portion preferably has a short cylindrical surface 19. The outer race member 10, on either side, is provided with a short cylindrical surface 20, which is of slightly smaller diameter than the cylindrical surface 19. The two flanges 18 of the two inner race members are provided between and spaced inwardly of the two surfaces 20 of the outer race member as shown in Fig. 1, so that the flanged portions of the inner race member constitute seals which act both to prevent loss or removal of the balls and to aid in maintaining the lubricant in the bearing. They act further in preventing foreign matter from entering the bearing.

The various parts of the bearing are assembled by forcing one of the parts of the inner race member into position so that the flange 18 is forced through the point of minimum diameter of the outer race member to the position shown in Fig. 1. The surfaces 19 and 20 as previously mentioned, are of cylindrical form so they may be readily made of the exact size required, although obviously it is not essential that these surfaces be cylindrical as they may be of any other form desired. The balls are then applied in an annular series, and the other part of the inner race member is then forced into position from the opposite side of the bearing, the two parts of the inner race member being then axially juxtaposed. After assembly of the bearing the shaft 16 may be forced through both the parts 14 and 15.

Figure 2:
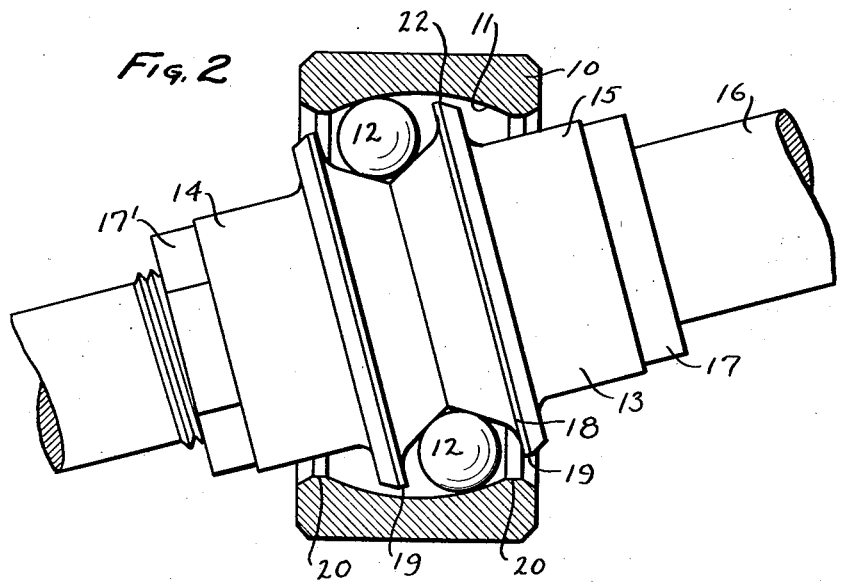
Fig. 2 is a sectional view showing the axis of the inner and outer bearing members relatively displaced.

The bearing is so arranged that the distance between the point 22 and the center of the bearing, designated 23, is slightly smaller than the radius of the spherical bearing surface 11, and there is thus a small distance between the inside edge of the surface 20 and the outside edge of surface 19 measured in a direction parallel with the axis of the bearing so that when the parts are assembled the sealing flange 18 can tilt beyond the cylindrical surface 20 of the outer bearing member as shown in Fig. 2, thus permitting the shaft axis to move through a considerable angle from a position corresponding with the axis of the outer race member. Even when the axis of the shaft is considerably tilted the flange is effective in sealing the bearing. The axial distance normally provided between the surfaces 19 and 20 is preferably made slightly less than one-half the ball diameter so that the various parts of the bearing will not become separated. If the axial distance between the surfaces 19 and 20 were greater than half the ball diameter, before attaching the inner bearing member parts to a common shaft these inner parts might separate a sufficient distance so that the balls could be lost.

The invention is applicable to bearings of various sorts and sizes, but in a small bearing such as may be employed in control systems for aircraft engines or the like, where the outside diameter of the surface 19 may be of the order of .3", the diameter of the surface 20 is preferably made a few thousandths of an inch smaller than the diameter of surface 19 so that the parts can be readily pressed into position. However, as soon as the surfaces 19 and 20 have passed each other the inner race cannot be extracted except by great force from the inside. The bearing, therefore, forms a complete assembly and cannot come apart.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A ball bearing comprising an outer race member having an integral spherically formed portion providing a complete bearing surface, a two-part inner race member, said two parts together providing a ball raceway and each of said parts having an extended portion outside of the ball location and of a diameter at least as large as the minimum internal diameter of the said integral portion and arranged so that the said extended portion is provided inwardly of said integral portion of minimum internal diameter, and a plurality of balls between said members.

2. A ball bearing comprising an integral outer race member having an internal race surface, a two-part inner race member, said two parts together providing a ball raceway, each of said parts having an extended portion outside of the ball location of larger diameter than the minimum internal diameter of the integral outer race member, the said extended portions being each provided inwardly of the points of minimum internal diameter of the outer race member, and a plurality of balls between said members.

3. A ball bearing comprising an outer race member having an internal spherical bearing surface of one piece construction, a two part inner race member each part providing a portion of a single raceway, a flange on each of said parts extending toward but inwardly of a portion of said one-piece bearing surface with smaller diameter than the flange, and a plurality of balls between said members serving to locate the same against relative displacement.

4. A ball bearing comprising an integral outer race member having an internal bearing surface, and having opposed short cylindrical surfaces each directly continuing and extending outwardly from each end of said spherical surface, a two part inner race member each part providing an annular portion of a ball raceway and each part having a flange of larger diameter than the internal diameter of said cylindrical surfaces and spaced inwardly between said cylindrical surfaces, and a plurality of balls between said members.

5. A ball bearing comprising an integral outer race member having an internal spherical bearing surface, a two part inner race member the parts being axially aligned and each part providing a portion of a ball raceway, a plurality of balls between said members, each of said parts having a flange extending toward but inwardly of a portion of said integral outer race member of smaller diameter than the flange, the maximum radius of each of said flanges from the spherical center of the bearing being less than the radius of the spherical bearing surface of the outer race member.

6. A ball bearing comprising an outer race member having an internal spherical bearing surface, a two part inner race member each part providing a portion of a ball raceway, and a plurality of balls between said members, each of said parts having a flange extending toward but inwardly of portions integral with said outer race member of smaller diameter than the flanges, the distance between a flange and the adjacent portion of the outer race member of smaller diameter measured in a direction parallel to the axis of rotation being substantially less than one half the ball diameter.

7. A ball bearing comprising an integral outer race member having an internal spherical bearing surface and having short cylindrical surfaces one on either side of said spherical surface each directly continuing said spherical surface laterally, a two part inner race member each part providing a half of a ball raceway, the two parts being of similar form and axially juxtaposed, each part having a short flange of slightly larger diameter than the cylindrical surfaces of the outer race member and provided inwardly of said cylindrical surfaces, and a plurality of balls between said members.

JOSEPH M. GWINN, Jr.